(12) United States Patent
Gray

(10) Patent No.: US 10,939,186 B2
(45) Date of Patent: Mar. 2, 2021

(54) VIRTUAL COLLABORATION SYSTEM AND METHOD

(71) Applicant: Kimberly Denise Gray, New York, NY (US)

(72) Inventor: Kimberly Denise Gray, New York, NY (US)

( * ) Notice: Subject to any disclaimer, the term of this patent is extended or adjusted under 35 U.S.C. 154(b) by 0 days.

(21) Appl. No.: 16/022,946

(22) Filed: Jun. 29, 2018

(65) Prior Publication Data

US 2018/0367869 A1    Dec. 20, 2018

Related U.S. Application Data

(60) Provisional application No. 62/492,459, filed on May 1, 2017.

(51) Int. Cl.
| H04N 21/854 | (2011.01) |
| G06Q 50/00 | (2012.01) |
| H04L 29/06 | (2006.01) |
| H04N 21/81 | (2011.01) |
| H04N 21/4788 | (2011.01) |

(52) U.S. Cl.
CPC ........... *H04N 21/854* (2013.01); *G06Q 50/01* (2013.01); *H04L 65/4053* (2013.01); *H04N 21/4788* (2013.01); *H04N 21/8146* (2013.01)

(58) Field of Classification Search
CPC ............. H04N 21/854; H04N 21/4788; H04N 21/8146; H04L 65/4053; G06Q 50/01
See application file for complete search history.

(56) References Cited

U.S. PATENT DOCUMENTS

| 8,905,763 | B1* | 12/2014 | Hu ......................... | G09B 19/00 434/365 |
| 2004/0221323 | A1* | 11/2004 | Watt ...................... | H04L 65/403 725/135 |
| 2008/0013916 | A1* | 1/2008 | Sharpe ................. | G11B 27/034 386/278 |
| 2009/0063995 | A1* | 3/2009 | Baron .................... | G06Q 10/10 715/753 |
| 2011/0026898 | A1* | 2/2011 | Lussier ................ | G11B 27/034 386/280 |
| 2012/0317210 | A1* | 12/2012 | Fisher ..................... | H04L 51/16 709/206 |
| 2013/0145269 | A1* | 6/2013 | Latulipe .................. | G06F 3/048 715/720 |
| 2013/0202005 | A1* | 8/2013 | Dutt ...................... | H01L 29/165 372/50.1 |

(Continued)

*Primary Examiner* — Tadesse Hailu
(74) *Attorney, Agent, or Firm* — Robert Cantrell; Jose Jimenez; Jimenez Law Firm

(57) ABSTRACT

A system of virtual collaboration. The system includes at least one computing device having a processor and a memory. The memory includes software in the form of computing device-executable instructions that, when executed by the processor, cause the processor to implement: a communications interface, a user interface, and a virtual collaboration platform. The virtual collaboration platform includes, but is not limited to, a generation module, an interaction module, and a consolidation module. The virtual collaboration platform allows users to direct other users to create virtual content regarding a particular subject and generate a collaborated video.

5 Claims, 4 Drawing Sheets

(56) References Cited

U.S. PATENT DOCUMENTS

| | | | |
|---|---|---|---|
| 2013/0311561 A1* | 11/2013 | Ku | G06F 3/0484 |
| | | | 709/204 |
| 2013/0343726 A1* | 12/2013 | Shackleton | H04N 21/4532 |
| | | | 386/282 |
| 2014/0186004 A1* | 7/2014 | Hamer | H04N 21/21805 |
| | | | 386/223 |
| 2015/0033153 A1* | 1/2015 | Knysz | G06Q 50/01 |
| | | | 715/753 |
| 2015/0149906 A1* | 5/2015 | Toff | G11B 27/031 |
| | | | 715/723 |
| 2015/0334168 A1* | 11/2015 | Kosslyn | H04L 67/10 |
| | | | 709/204 |
| 2015/0339303 A1* | 11/2015 | Perlegos | G06F 16/7867 |
| | | | 707/756 |
| 2015/0346937 A1* | 12/2015 | Mahmoudian-Bidgoly | |
| | | | G06F 3/04812 |
| | | | 715/753 |
| 2015/0356649 A1* | 12/2015 | Glass | G06Q 20/12 |
| | | | 705/26.1 |
| 2016/0253912 A1* | 9/2016 | Heilman | G09B 7/02 |
| | | | 434/309 |
| 2017/0024100 A1* | 1/2017 | Pieper | G06F 3/0486 |
| 2017/0032470 A1* | 2/2017 | Watanachote | G06Q 10/067 |
| 2017/0039867 A1* | 2/2017 | Fieldman | G11B 27/031 |
| 2017/0201478 A1* | 7/2017 | Joyce | H04L 67/42 |
| 2017/0235536 A1* | 8/2017 | Chang | G06F 3/04842 |
| | | | 715/753 |
| 2018/0295079 A1* | 10/2018 | Longo | H04L 51/24 |

* cited by examiner

VIRTUAL COLLABORATION SYSTEM AND METHOD

CROSS-REFERENCE TO RELATED APPLICATION

This application claims the benefit of priority of U.S. provisional application No. 62/492,459, filed May 1, 2017, the contents of which are herein incorporated by reference.

BACKGROUND OF THE INVENTION

The present invention relates to a virtual collaboration system and method and, more particularly, to a virtual collaboration system and method that generates sequences of videos from a virtual collaboration.

Social media, e-learning, learning management systems (LMS), and massive open online courses (MOOCS) are computing device-mediated technologies that facilitate the creation and sharing of information, ideas, knowledge, career interests, and other forms of expression via virtual communities and networks. Users typically access social media services, e-learning, and LMS via web-based technologies on desktop and laptops or download services that offer social media functionality to their mobile devices (e.g., smartphones and tablet computing devices). When engaging with these services, users can create highly interactive platforms through which individuals, communities, and organizations can share, co-create, discuss, engage, share curriculums, and modify user-generated content or pre-made content posted online. Current social media, e-learning, LMS, and MOOCS platforms and plugins fail to allow users to collaborate with one another by using video comments and video responses.

As can be seen, there is a need for a virtual collaboration system and method that generates sequences of videos from a virtual collaboration.

SUMMARY OF THE INVENTION

In one aspect of the present invention, a system for virtual collaboration comprises: a processor, and a memory comprising computing device-executable instructions that, when executed by the processor, cause the processor to implement: a communications interface for accessing a virtual collaboration platform over a network; a user interface for displaying and interacting with the virtual collaboration platform; a generation module for generating a virtual collaboration on the virtual collaboration platform, wherein the virtual collaboration comprises an initial post comprising at least one of an image and a video recording; an interaction module for adding a response post to the virtual collaboration, wherein the response post comprises a response video recording; and a consolidation module for generating a collaboration video of the virtual collaboration, wherein the collaboration video comprises a plurality of the response posts linked together.

In another aspect of the present invention, a method of virtual collaboration comprises steps of: producing, via software running on a plurality of computing devices, a virtual collaboration platform, wherein the plurality of computing devices are connected by a network; generating, via the software running on a first computing device of the plurality of computing devices, a virtual collaboration on the virtual collaboration platform, wherein the virtual collaboration comprises an initial post comprising at least one of an image and a video recording; generating and adding, via the software running on a plurality of different second computing devices of the plurality of computing devices, a plurality of response posts to the virtual collaboration, wherein the plurality of response posts each comprise a different response video recording; and generating, via the software running on the plurality of computing devices, a collaboration video of the virtual collaboration, wherein the collaboration video comprises the plurality of response posts linked together.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a virtual collaboration platform that allows users to create original short form content by sharing text through a video capture screen and responding to posts with video responses. The media platform allows users to direct other users to create virtual collaborated content regarding a particular subject and post the collaborated content on the virtual collaboration platform. The present invention allows users to direct other users to create content. For example, the user may direct other users to tell a story, review a product, provide suggestions on certain topics, make a dance video, create branded advertising such as a commercial, respond to a product review, create reality style documentary video content, social curriculum collaboration, educational collaboration, professional training, and the like.

Figure 1:
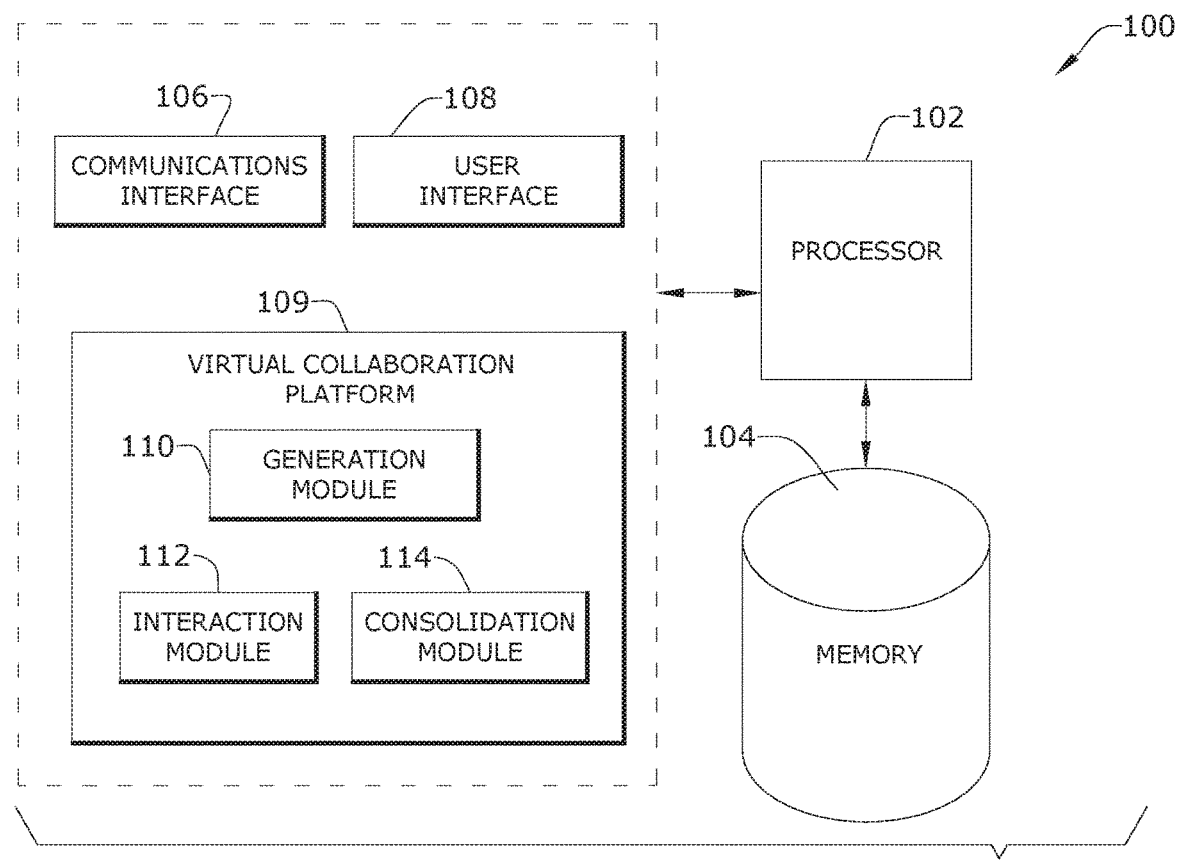
FIG. 1 is schematic view of a computing device of an embodiment of the present invention.
Figure 2:
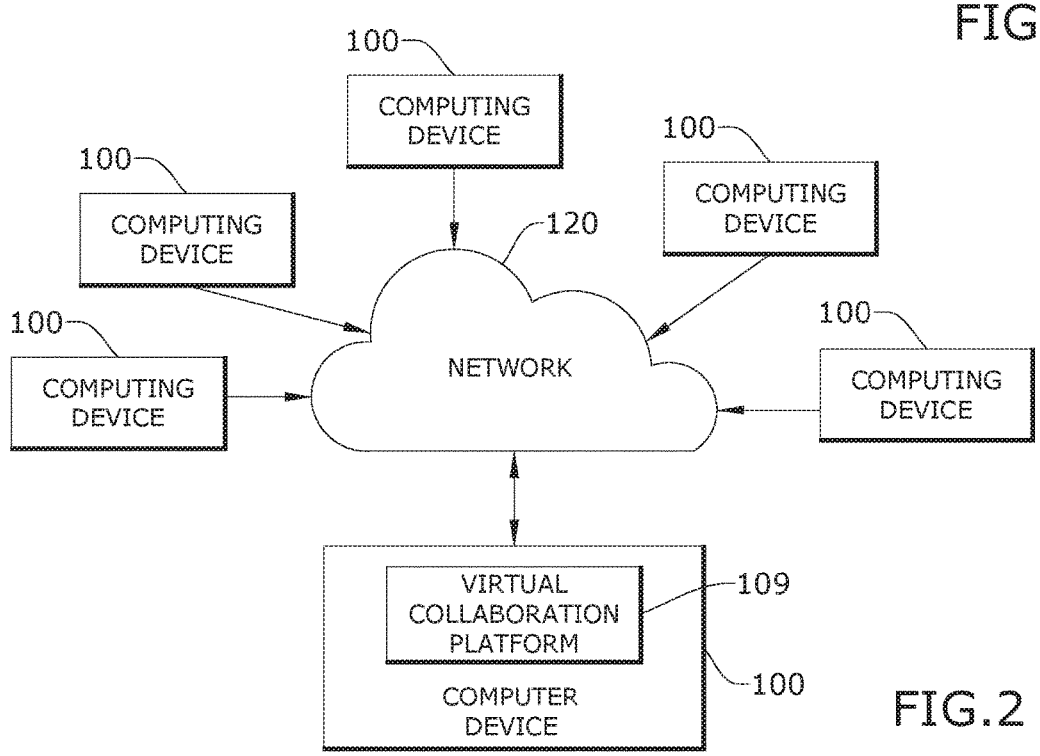
FIG. 2 is a schematic view of a network of computing devices of an embodiment of the present invention.
Figure 3:
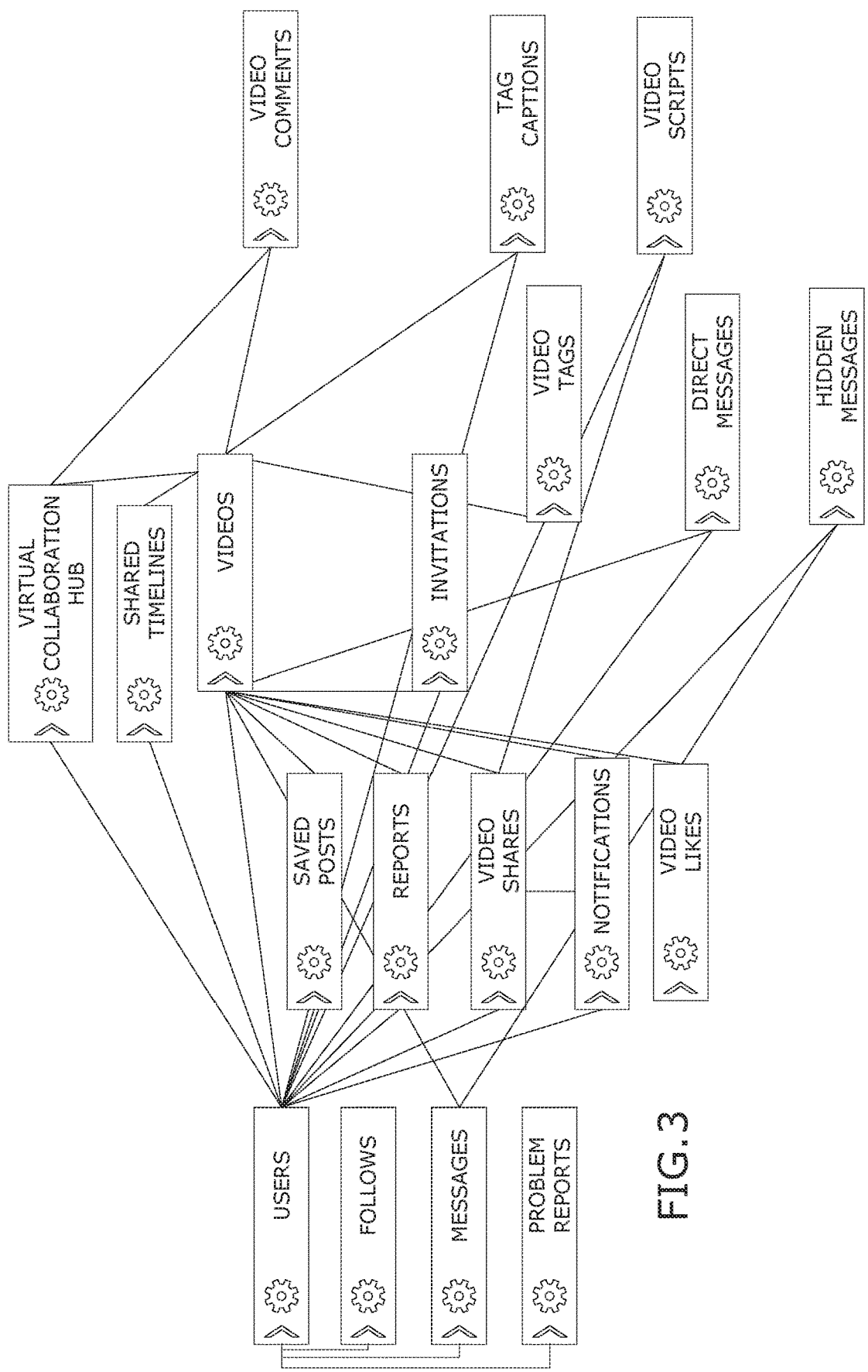
FIG. 3 is a schematic view of a software of an embodiment of the present invention.

Referring to FIGS. 1 through 3, the present invention includes a system of virtual collaboration. The system includes at least one computing device 100 having a processor 102 and a memory 104. The memory 104 includes software in the form of computing device-executable instructions that, when executed by the processor, cause the processor to implement: a communications interface 106, a user interface 108, and a virtual collaboration platform 109. The virtual collaboration platform 109 includes, but is not limited to, a generation module 110, an interaction module 112, and a consolidation module 114.

The computing device 100 is at least the processor 102 and the memory 104. The computing device 100 may include a smart phone, a tablet computer, a laptop, a desktop, and the like. The computing device 100 may execute on any suitable operating system such as IBM's zSeries/Operating System (z/OS), MS-DOS, PC-DOS, MAC-iOS, WIN- DOWS, UNIX, OpenVMS, ANDROID, an operating system based on LINUX, or any other appropriate operating system, including future operating systems.

In particular embodiments, the computing device 100 includes the processor 102, the memory 104, the user interface 108, and the communication interface 106. In particular embodiments, the processor 102 includes hardware for executing instructions, such as those making up a computing device program. The memory includes main memory for storing instructions such as computing device program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory 104 may include removable or non-removable (or fixed) media, where appropriate. The memory 104 may be internal or external to the computing device 100, where appropriate. In particular embodiments, the memory 100 is non-volatile, solid-state memory.

The user interface 108 is for displaying and interacting with the virtual collaboration platform 109. The user interface 108 includes hardware, software, or both providing one or more interfaces for user communication with the computing device. As an example and not by way of limitation, the user interface 108 may include a keyboard, keypad, microphone, monitor, mouse, printer, scanner, speaker, still camera, stylus, tablet, touchscreen, trackball, video camera, another user interface or a combination of two or more of these.

The communications interface 106 is for accessing a virtual collaboration platform 109 over a network 120. The communication interface 106 includes hardware, software, or both providing one or more interfaces for communication (e.g., packet-based communication) between the computing device 100 and one or more other computing devices 100 on one or more networks 120. As an example and not by way of limitation, communication interface 106 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 106. As an example and not by way of limitation, the computing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 120 may be wired or wireless. As an example, the computing device 100 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing device 100 may include any suitable communication interface 103 for any of these networks 120, where appropriate.

The virtual collaboration platform 109 may include a standalone software program, such as a social media program or an e-collaboration program. The standalone program may include a plurality of different user's that create profiles with identifying pictures, videos, personal data, and the like. Alternatively, the virtual collaboration platform 109 may include an application programming interface (API) plugin as a video commenting plugin tool that agnostically integrates a video commenting feature into already existing software platforms, web servers, and mobile based platforms. The API plugin may integrate the video commenting feature described in more detail below into existing e-learning platforms, such as but not limited to LMS and MOOCS, e-commerce, social media network platforms, news platforms, media platforms, blog platforms, product and service website platforms, and the like to enable real time video response.

As a social media standalone software program, the virtual collaboration platform 109 may include a main page and a plurality of individual user profile pages. The main page may include a news feed, and each of the plurality of user profile pages may include a user's picture, video, and shared user personal data. The virtual collaboration platform 109 allows users to friend request one another, similar to other social media platforms. Once users are friends, the users may view each other's profile pages, engage in instant messaging via a message portal, and tag one another for virtual collaborations, as described in further detail below.

The virtual collaboration platform 109 supports a generation module 110, an interaction module 112, and a consolidation module 114 as a standalone software program or as a API plugin.

The generation module 110 is for generating a virtual collaboration on the virtual collaboration platform 109. To generate a virtual collaboration, the user may upload a text, a video, an image, or a combination thereof, which may be original content created at the time of the creation of the virtual collaboration or extracted from a memory of the computing device 100. User's may create a virtual collaboration between user to user, user to group, and user to public. If the user tags specified users, the virtual collaboration may only show up on the specified users' profile page, the specified user's message portal, the specified user's news feed, or combination thereof. If the user makes the virtual collaboration public, the virtual collaboration may appear on the news feed for all of the user's friends to view. The initial post may include an instruction or request for a type of response posts. For example, the initial post may include an image having a text. The text may be the instructions.

The generation module 110 may be called "Script Share." Script share directs others to create content using Action Command Messages (ACM). ACM is when a user creates a post using Script Share and tags other users to create content based on the text instructions. In certain embodiments, the Script Share may offer different template formats for users to utilize. For example, the template formats may include, but are not limited to, music video, series, reality, video podcast, branded content (advertisements), learning and training based curriculum, and the like. The template formats indicate different themes in which the Script Share feature is used.

Other users may respond to the initial message within the virtual collaboration. The interaction module 112 is for adding a response post to the virtual collaboration via the ACM. The response videos are original content created at the time of the creation of the response post. In certain embodiments, the interaction module 112 prompts the user interface 108 to display a record button, a live video feed taken by a video camera, and an overlay of the text on the live video feed. The user may select the record button, which records the live video feed with the overlaid text to generate a response post. A plurality of different users may generate a response post including a video of a response to the instructions with the overlaid text. Each of the response posts are posted to the virtual collaboration.

The present invention then merges the video responses together, creating a collaboration video. The consolidation module 114 is for generating a collaboration video of the virtual collaboration. The collaboration video is a plurality of the response posts linked together as a string. The collaboration video is displayed on the user interface as a sequence of the plurality of the response videos side by side. For example, the user interface 108 may display an image of a strip of film. Each one of the response post videos may be disposed in order within the strip of film. The user profile picture may be embossed over each of the response post videos to indicate who made the response post. Each of the response videos may be selectable from the user interface 108 to play individually or as a sequence of videos starting from the selected response video.

As mentioned above, if the user makes the virtual collaboration public the virtual collaboration may appear on the news feed for all of the user's friends. If the user makes the virtual collaboration private, the virtual collaboration may appear on the news feed of the selected users. The news feed of each individual user may include a plurality of previously posted public or private virtual collaborations, in which the user may scroll through and select. When the user selects a previously posted public or private virtual collaboration, the user may view the collaboration video of the previously generated virtual collaboration. In certain embodiments, the user may generate and add a response post to any of the previously generated virtual collaborations on the user's news feed.

As mentioned above, the virtual collaborations may be created using template formats such as, but are not limited to, music video, series, reality, video podcast, branded content (advertisements), learning and training based curriculum, and the like. The virtual collaboration platform 109 may include a virtual collaboration hub. The virtual collaboration hub categorizes each of the virtual collaborations into groups based on the template format. User's may access the virtual collaboration hub via the virtual collaboration platform and view the virtual collaborations within their groups, in which the user may scroll through and select. When the user selects a previously posted public or private virtual collaboration, the user may view the collaboration video of the previously generated virtual collaboration. In certain embodiments, the user may generate and add a response post to any of the previously generated virtual collaborations in the virtual collaboration hub.

Figure 4A:
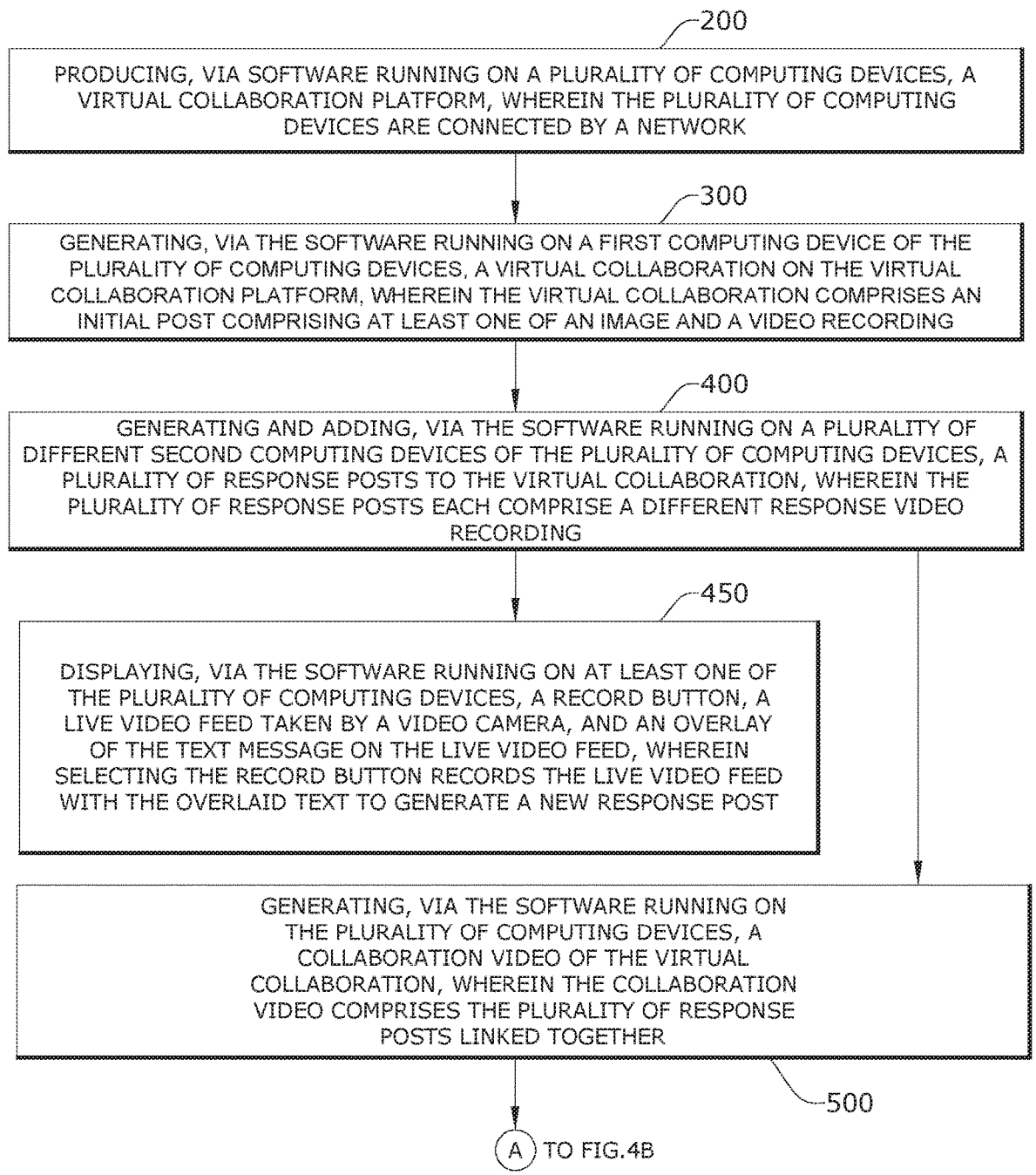
FIG. 4A is a flow chart of a method of an embodiment of the present invention.
Figure 4B:
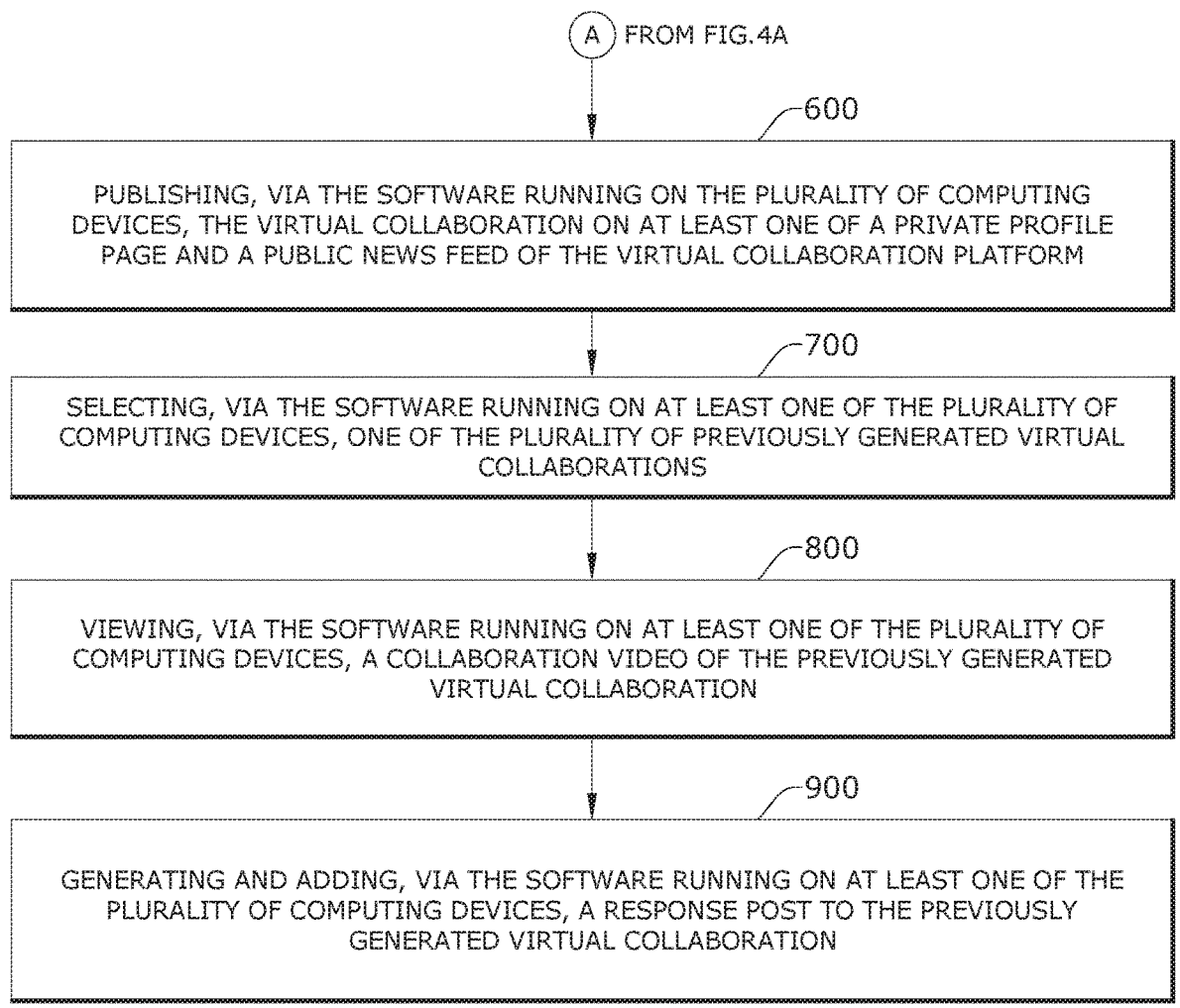
FIG. 4B is a continuation of the flow chart of FIG. 4A.

Referring to FIGS. 4A and 4B, a method of virtual collaboration may include the following steps. Produce, via software running on a plurality of computing devices, a virtual collaboration platform, wherein the plurality of computing devices are connected by a network 200. Generate, via the software running on a first computing device of the plurality of computing devices, a virtual collaboration on the virtual collaboration platform, the virtual collaboration including an initial post having at least one of a text, an image, and a video recording 300. Generate and add, via the software running on a plurality of different second computing devices of the plurality of computing devices, a plurality of response posts to the virtual collaboration, the plurality of response posts each having a different response video recording 400. Step 400 may be utilized via the following steps. Display, via the software running on at least one of the plurality of computing devices, a record button, a live video feed taken by a video camera, and an overlay of the text on the live video feed. Selecting the record button records the live video feed with the overlaid text to generate a new response post 450. Generate, via the software running on the plurality of computing devices, a collaboration video of the virtual collaboration, the collaboration video including the plurality of response posts linked together 500 in a string.

In certain embodiments, the method of the present invention may further include the following steps. Publish, via the software running on the plurality of computing devices, the virtual collaboration on at least one of a private profile page, a private news feed, and a public news feed of the virtual collaboration platform 600. Select, via the software running on at least one of the plurality of computing devices, one of the plurality of previously generated virtual collaborations 700. View, via the software running on at least one of the plurality of computing devices, a collaboration video of the previously generated virtual collaboration 800. Generate and add, via the software running on at least one of the plurality of computing devices, a response post to the previously generated virtual collaboration 900. The virtual collaboration platform of the method described above may be a stand alone software, such as a social media platform or an e-collaboration program, or an API plugin that adds video media collaboration to other software programs.

It should be understood, of course, that the foregoing relates to exemplary embodiments of the invention and that modifications may be made without departing from the spirit and scope of the invention as set forth in the following claims.

What is claimed is:

1. A system having real time virtual education collaboration comprising:
   a processor, and a memory comprising computing device-executable instructions that, when executed by the processor, cause the processor to implement:
   a communications interface for accessing a virtual collaboration platform over a network;
   a user interface for displaying and interacting with the virtual collaboration platform, the user interface adapted to allow the user to selectively direct with one or more of text, video, or an image one or more other users to create virtual collaborated content regarding a particular subject and post collaborated content on the virtual collaboration platform;
   a generation module for generating a virtual collaboration on the virtual collaboration platform, wherein the virtual collaboration comprises an initial post comprising at least one of a text, an image, and a video recording in association with an action command message;
   an interaction module for adding a response post in real time to the virtual collaboration, wherein the response post comprises a response video recording, the interaction module prompting the user interface to display a record button, a live video feed taken by a video camera, and an overlay of the text on the live video feed, wherein selecting the record button records the live video feed with the overlaid text to generate the response post, the plurality of previously generated virtual collaborations selectable on the user interface to view the collaboration video of the virtual collaboration and implement the interaction module for generating and adding the response post to the virtual collaboration;
   the education collaboration video displayed on the user interface as a sequence of the plurality of the response videos side by side, wherein each of the response videos is selectable to play individually or as a sequence of videos starting from the selected response video; and a consolidation module for generating a collaboration video of the virtual collaboration, wherein the collaboration video comprises a plurality of the response posts linked together solely in real time, wherein each response post is overlaid with said action command message.

2. The system of claim 1, wherein the initial post comprises the image, wherein the image comprises said action command message.

3. The system of claim 1, wherein the virtual collaboration platform comprises a news feed generated by action command messaging comprising a plurality of previously generated virtual collaborations and plugs-in to integrate video commenting into one or more existing e-learning platforms.

4. A method having real time virtual teaching collaboration comprising steps of:

produce, via software running on a plurality of computing devices, a virtual teaching collaboration platform, wherein the plurality of computing devices are connected by a network;

generating, via a script share modality of the software running on a first computing device of the plurality of computing devices, a real time virtual curriculum on the virtual teaching collaboration platform, wherein the real time virtual curriculum comprises an initial post comprising at least one of an image and a video recording in association with an action command message;

generating, via software running on a user's interface, instructions to selectively direct with one or more of text, video, or an image, one or more other users to create virtual collaborated content regarding a particular subject and post collaborated content on the virtual collaboration platform;

displaying, via the software running on at least one of the plurality of computing devices, a record button, a live video feed taken by a video camera, and an overlay of the text on the live video feed, wherein selecting the record button records the live video feed with the overlaid text to generate a new response post;

generating and adding in real time, via the software running on a plurality of different second computing devices of the plurality of computing devices, a plurality of response posts to the real time virtual curriculum collaboration, wherein the plurality of response posts each comprise a different response video recording;

the virtual teaching collaboration platform including a news feed comprising a plurality of previously generated real time virtual curricula collaborations, further comprising steps of: selecting, via the software running on at least one of the plurality of computing devices, one of the plurality of previously generated real time virtual curricula;

viewing, via the software running on at least one of the plurality of computing devices, a collaboration video of the previously generated real time virtual curriculum and generating and adding, via the software running on at least one of the plurality of computing devices, a response post to the previously generated real time virtual curriculum; and generating, via the software running on the plurality of computing devices, a collaboration video of the real time virtual curriculum collaboration, wherein the collaboration video comprises the plurality of response posts linked together in real time, wherein each response post is overlaid with said action command message.

5. The method of claim 4, wherein the initial post comprises the image, wherein the image comprises said action command message.

* * * * *